(12) United States Patent
Pena

(10) Patent No.: US 6,292,211 B1
(45) Date of Patent: Sep. 18, 2001

(54) COMPUTER-AIDED TELECOMMUNICATION SYSTEM AND METHOD

(76) Inventor: Martin Rangel Pena, 11039 Painted Tree Rd., Charlotte, NC (US) 28226

( * ) Notice: Subject to any disclaimer, the term of this patent is extended or adjusted under 35 U.S.C. 154(b) by 0 days.

(21) Appl. No.: 09/419,729

(22) Filed: Oct. 16, 1999

(51) Int. Cl.$^7$ ...................................................... H04N 7/14
(52) U.S. Cl. .................................. 348/14.08; 348/14.09; 348/14.1; 705/42
(58) Field of Search ............................ 348/14.01, 14.02, 348/14.03, 14.04, 14.05, 14.06, 14.07, 14.08, 14.09; 379/90.01, 93.24, 100.01; 345/329, 330; 709/204, 205, 206; 705/42, 43

(56) References Cited

U.S. PATENT DOCUMENTS

| | | | |
|---|---|---|---|
| 5,872,922 | * | 2/1999 | Hogan et al. ........................ 709/204 |
| 6,085,177 | * | 7/2000 | Seample et al. ....................... 705/43 |
| 6,173,272 | * | 1/2001 | Thomas et al. ........................ 705/42 |

* cited by examiner

*Primary Examiner*—Curtis Kuntz
*Assistant Examiner*—Melur Ramakrishnaiah
(74) *Attorney, Agent, or Firm*—Dorothy S. Morse

(57) ABSTRACT

A computer-aided telecommunication system and method which uses an Internet web site and at least two computers to permit people located remotely from one another, and who may be unskilled in computer operation, to conduct real-time visual communication with other computer database subscribers, and promptly transmit to them money, still and moving images, and notices about sales, upcoming events, and employment opportunities at a cost that is relatively low when compared to alternative forms of communication. The simplest preferred embodiment of the system comprises two central processing units; two monitors; four keyboards; two printers; two printer/scanner/fax/copier combination devices; two video recorders; and at least two privacy booths each having a display screen, a camera, audio speakers, a microphone, an optional writing surface, and at least one piece of furniture that can comfortably accommodate visual correspondents. It is also contemplated for the system to comprise at least two control stations, at least one privacy booth and at least one e-mail station in the vicinity of each control station, as well as optional remote e-mail stations each placed in monitored locations, such as hotels or restaurants to deter theft and vandalism. Each subscriber is assigned a unique access code and e-mail address. For e-mail communication, subscribers would not have to know the recipient subscriber's e-mail address, only the name of the intended recipient subscriber or identification of the group of subscribers to which the e-mail communication is directed.

20 Claims, 9 Drawing Sheets

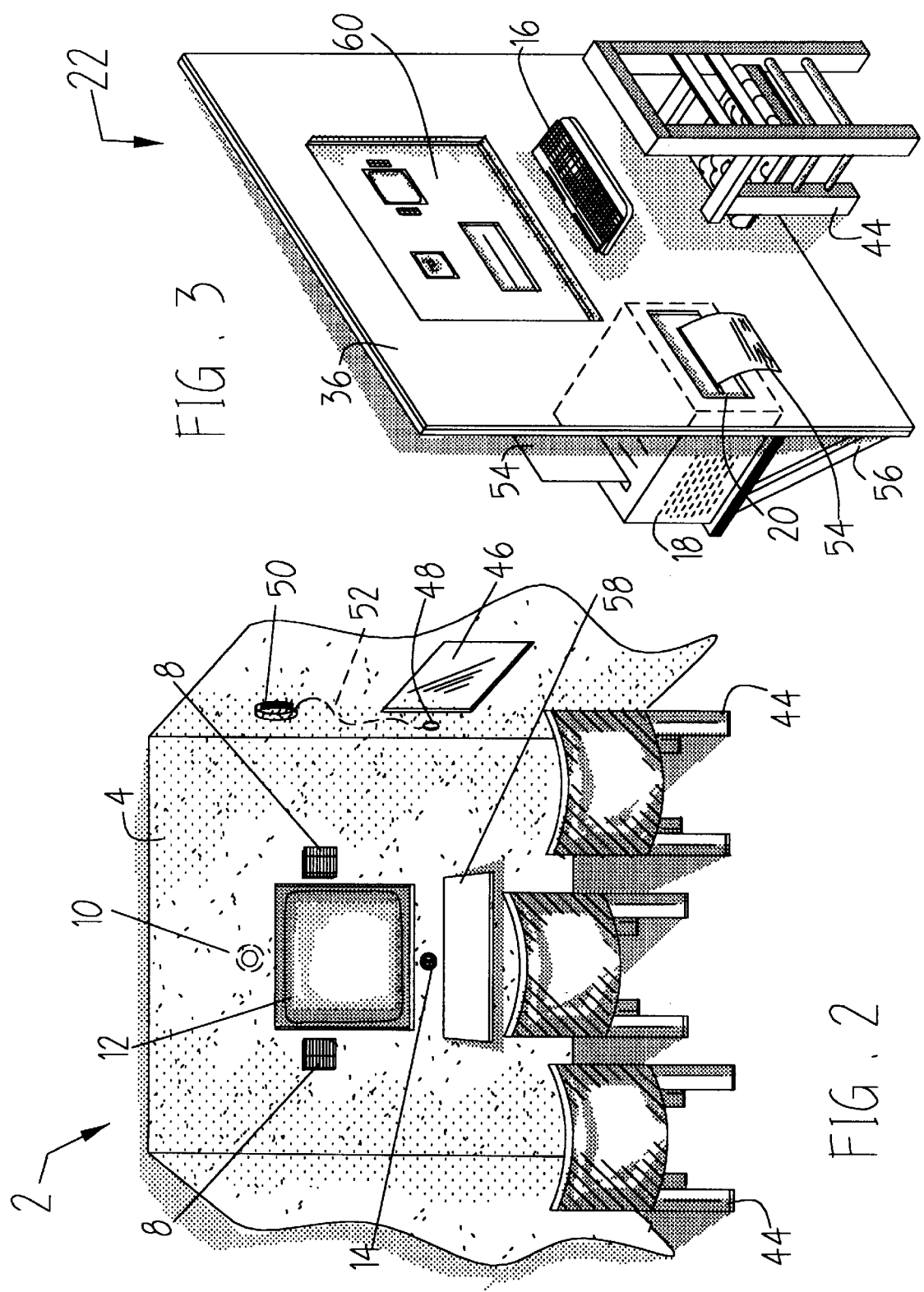

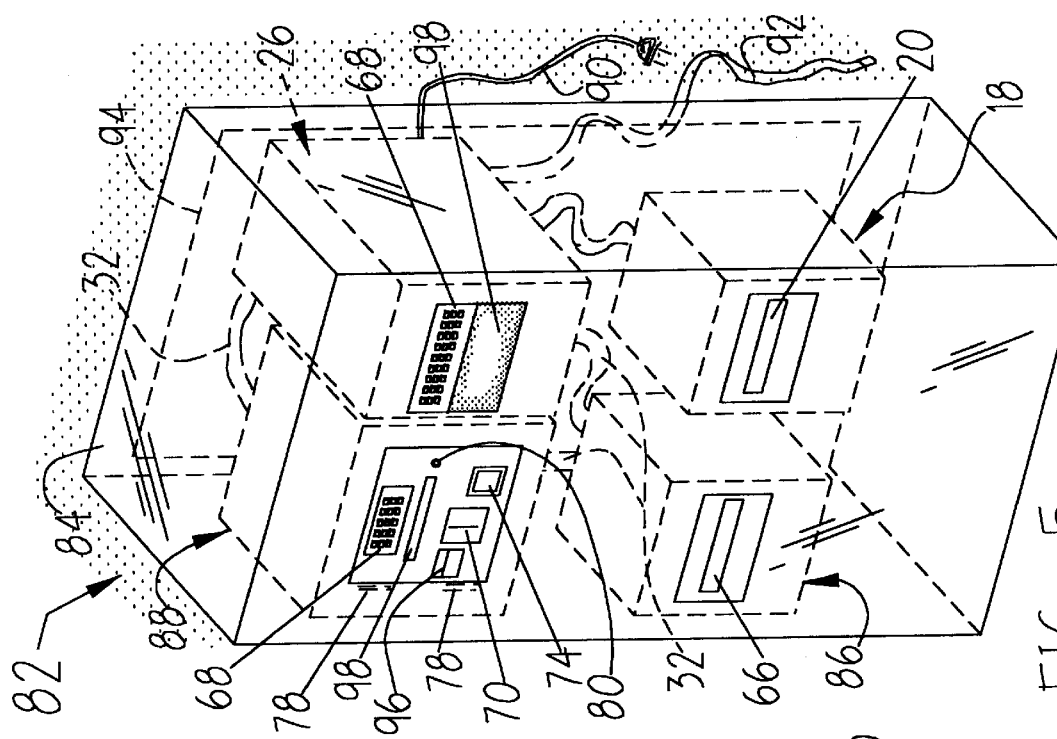
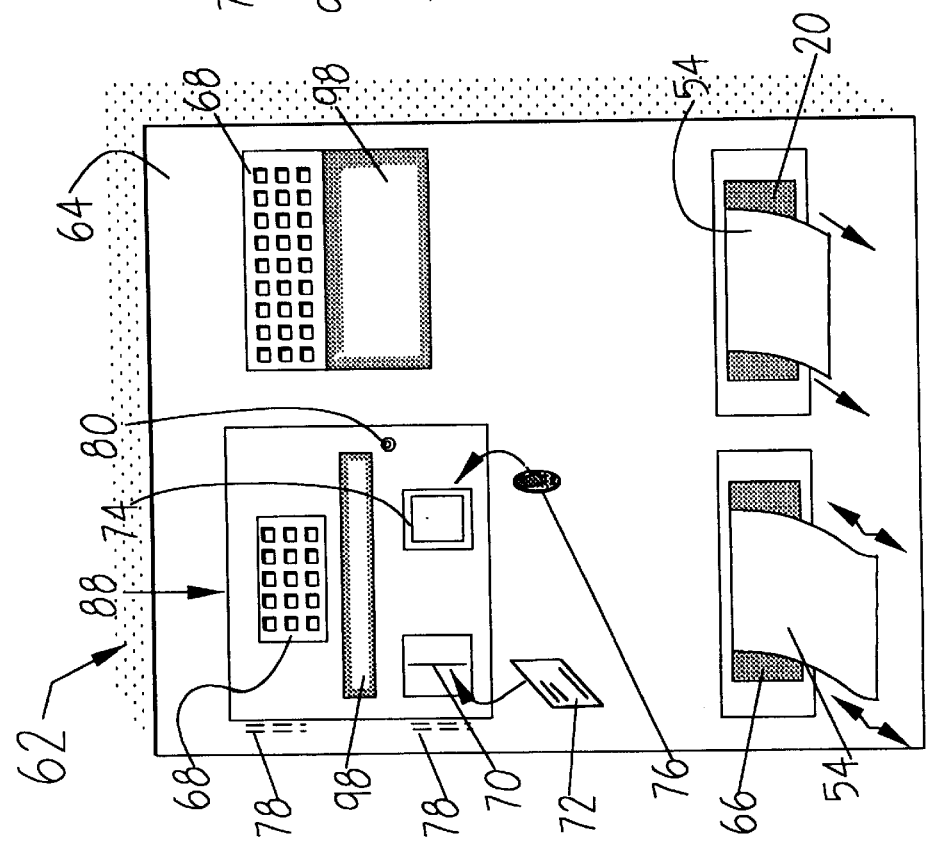
FIG. 5
FIG. 4

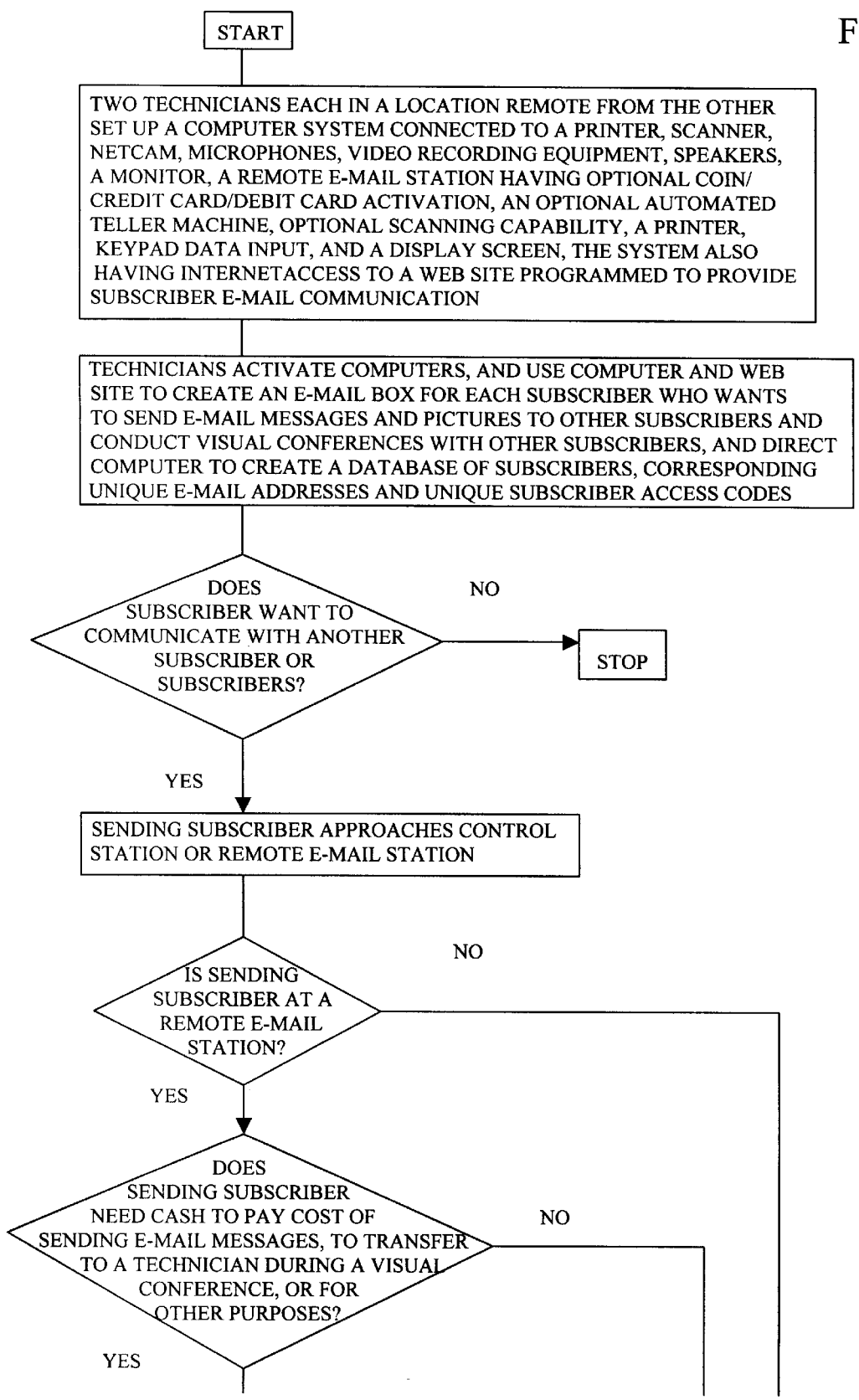
FIG. 6-1/6

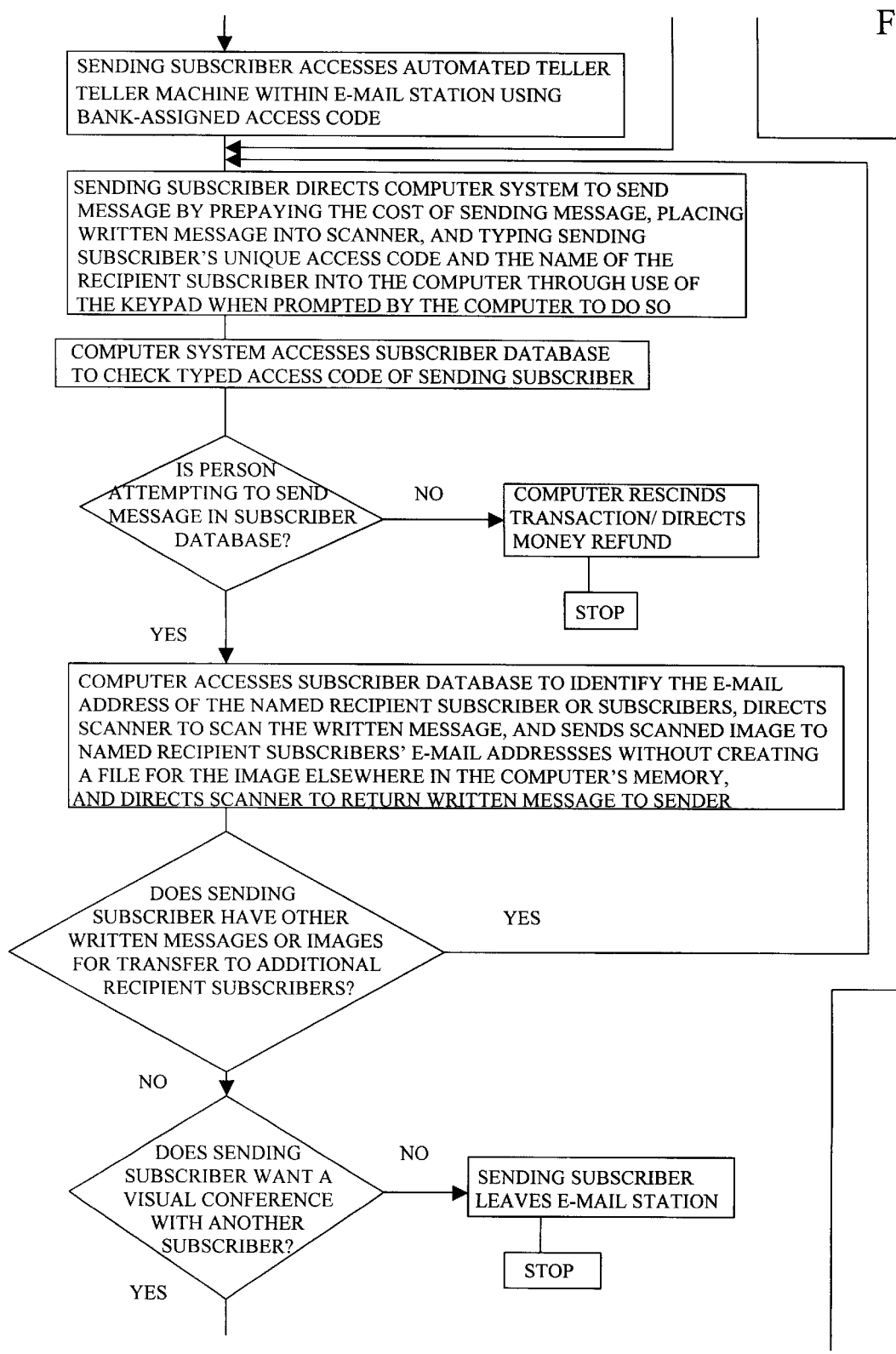
FIG. 6-2/6

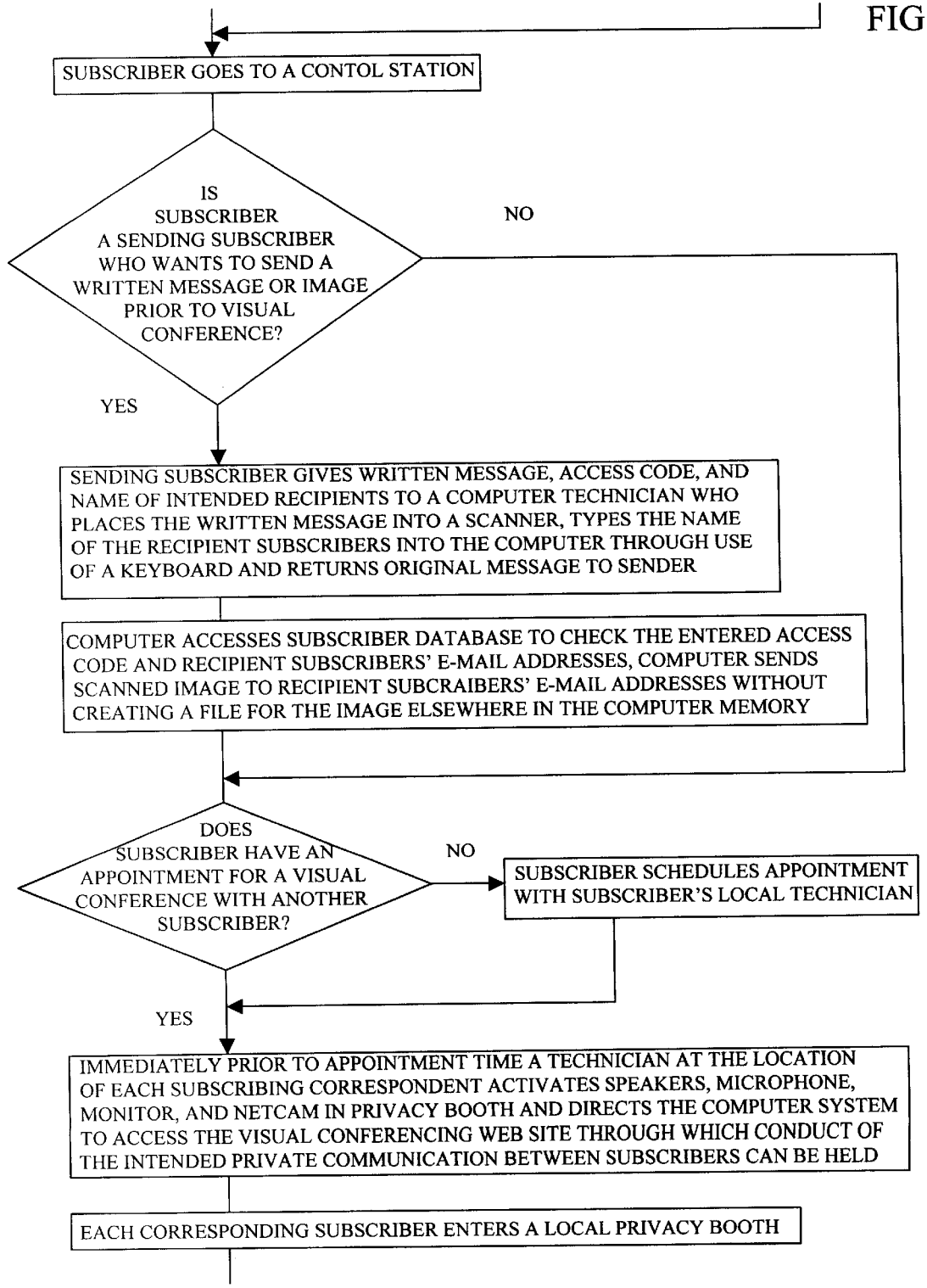
FIG. 6-3/6

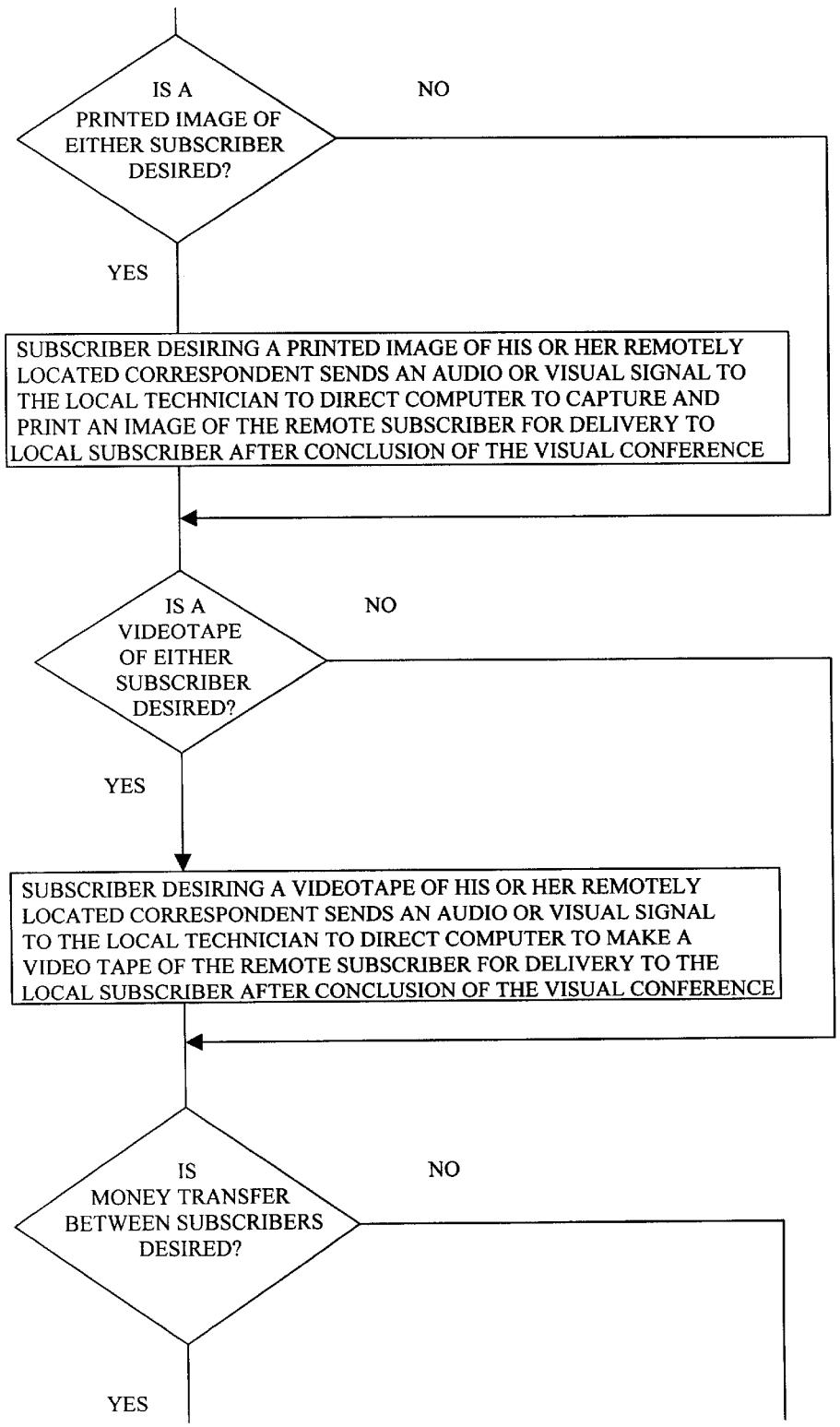
FIG. 6-4/6

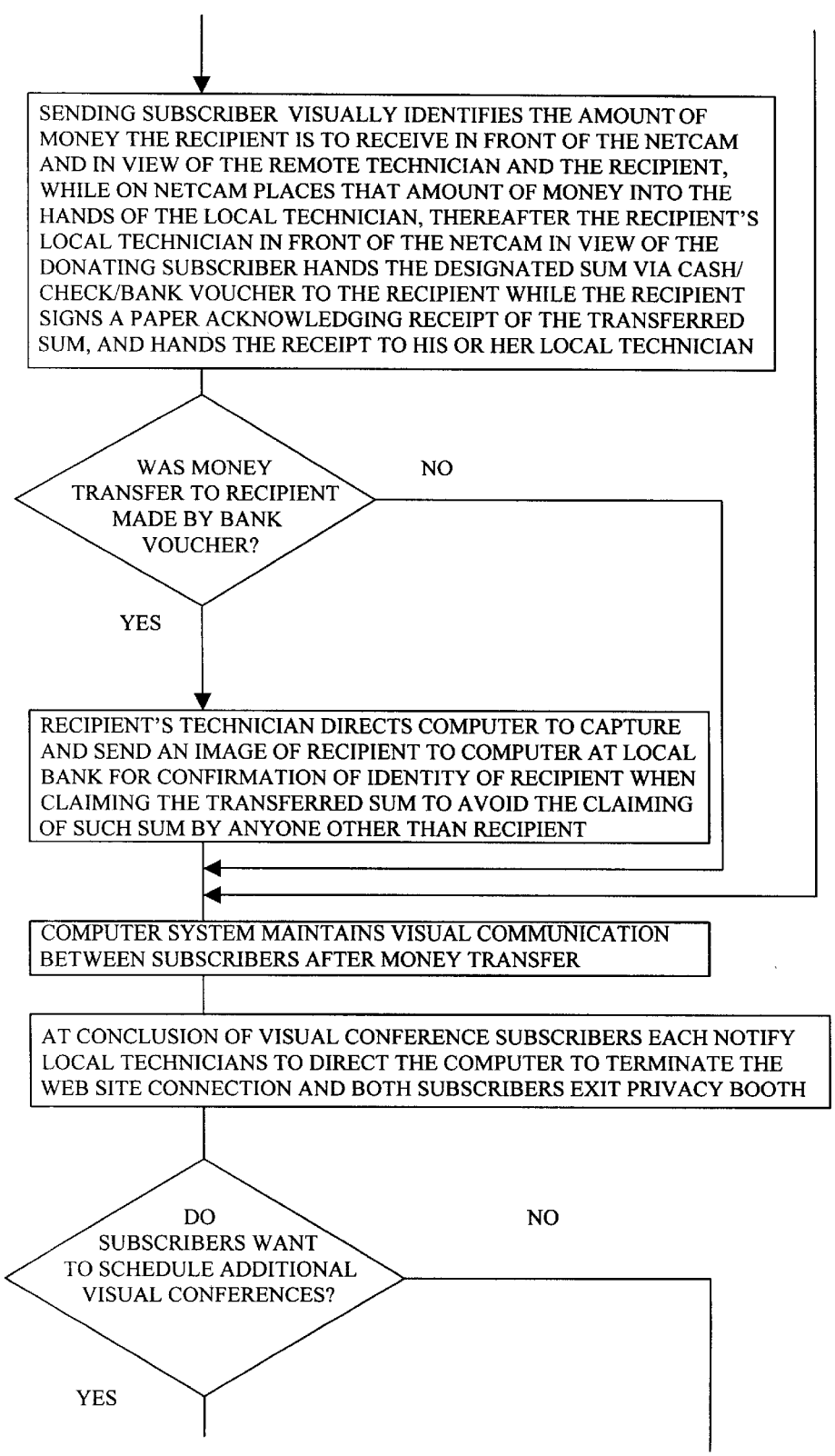
FIG. 6-5/6

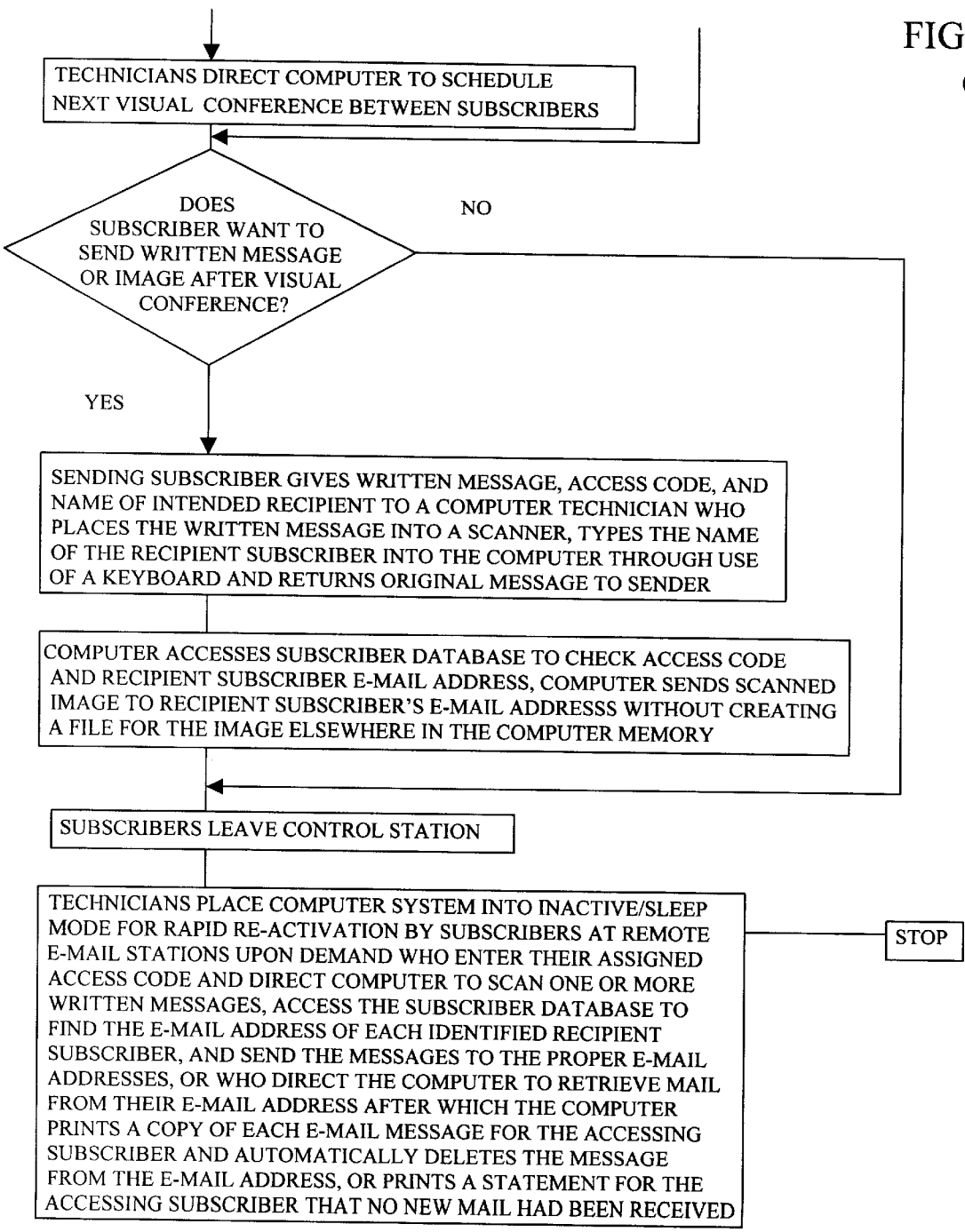
FIG. 6-6/6

COMPUTER-AIDED TELECOMMUNICATION SYSTEM AND METHOD

BACKGROUND

1. Filed of Invention

This invention relates to telecommunication and videoconferencing devices, specifically to a computer-aided system and method which uses an Internet web site and at least two computers to permit people located remotely from one another, and who may be unskilled in computer operation, to transfer written messages and images between them including the transfer of notices about events, sales, and employment opportunities directed to more than one recipient; conduct real-time visual communication with one another; securely transfer money from one to the other; and also optionally capture for each visual correspondent still and moving images of their remote correspondent or correspondents at a cost that is relatively low when compared to alternative forms of communication. The simplest preferred embodiment of the system comprises two central processing units; two computer monitors; four keyboards; two printers; two printer/scanner/fax/copier combination units unless separate equipment for printing, scanning, faxing, and copying is alternatively made available for use; two video recorders; and at least two privacy booths in which to conduct visual conferences, each having a high resolution monitor, a live video capture camera, audio speakers, at least one microphone, an optional writing surface, and at least one piece of furniture which can comfortably seat visual correspondents.

2. Description of Prior Art

Recent technological advances have made worldwide communication between many remotely located business associates, friends, and family members nearly instantaneous and relatively easy to accomplish. Also, for those having computer skills and inexpensive Internet access, the cost of such communication has been dramatically lowered. However, there are people who lack computer skills, those who travel frequently or become temporarily relocated for periods of time too short to establish or transfer local telephone service, and those who lack the ability to purchase the computer hardware and software necessary for Internet access, who have not been able to take advantage of this technology. These people find alternative forms of communication expensive, subject to delay, and often totally inadequate when an important letter or package is not delivered to the intended recipient in its original condition or is never delivered at all.

Non-Internet communication between people in different countries can be particularly difficult. A letter traveling to someone in a remote location can take two weeks or longer for delivery. Weak law enforcement and corruption can further complicate the process and place money transfer between friends and family members in different countries at particularly high risk. For example, a newspaper article recently cited the disappearance each year of millions of dollars sent by migrant workers in the United States to their families in Mexico. U.S. Postal Service money orders are used to send approximately one-third of such funds, and during the period between 1988 and 1998 claims alone for lost and stolen U.S. Postal Service money orders increased six-fold to more than $12 million. False identification is often used to divert the finds from the intended recipient. Violent gangs, as well as corrupt money exchangers, postal workers, and police, have been found responsible for perpetuating the problem. A secure means for transferring money between remotely located friends and family members, particularly when friends and family members are located in different countries, is not now known and is much needed.

The present invention brings a solution to the existing problem by offering to those who may be unskilled in computer operation, or not otherwise in a position to use computer technology, a way of accessing it so as to have instant communication with remotely located friends and family members, rapid transfer of money from one to the other, and also instant transfer of up-to-date still and/or moving images from one to the other at a cost that is relatively low when compared to alternative forms of communication. The temporary or permanent relocation of family members sometimes places a heavy burden on those affected by the separation. A parent temporarily separated from an infant or small child while seeking employment in a remote location for an indefinite period might want to occasionally see an updated picture of the child without having to wait several weeks or a month to receive it. Also, a parent or grandparent who will not see an adult child or grandchild for an extended period of time might occasionally enjoy or need the opportunity to speak with them about a variety of matters. Having visual contact with that person during such a conversation or for a special occasion would bring added pleasure and peace of mind to both parent, grandparent, child and/or grandchild, when each can see for themselves that the person with whom they are communicating appears to be in good health. Although visual contact could be accomplished by existing methods of videoconferencing, such methods are generally too expensive to be widely used for such non-business communication and data transfer. In addition, existing videoconferencing methods have no provision for money transfer between the participants.

Other disadvantages are also inherent in the alternative prior art methods available for communication between separated family members and friends. While written communication can be one of the least expensive options, travel delays are common in getting a written message to remote recipients, one must have a continually updated street or post office box address for successful delivery which is not always possible, and written messages are time consuming to compose. Further, letter writing is not a task enjoyed by everyone. Courier services and overnight mail can be used to help to insure more rapid and secure delivery of written communications, but at a premium cost that can make such services great for businesses but unaffordable by most individuals for routine use. Telephone communication has the advantage of being immediate, however a person long separated from his family often cannot afford the luxury of frequent videoconferencing communication and even routine long distance charges may be cost prohibitive for use as often as separated family members might like to remain in contact, particularly when international telephone calls are necessary. Other forms of communication, including the sending of audio and/or videotapes to one another, shortwave radio communication, faxing, and e-mail, all require the availability of expensive electronic equipment for both the sender and recipient. Another factor to assess in the use of electronic communication equipment is the minimum skill level required for people to operate it. There are those who are technically unskilled and would not be able to effectively use the simplest devices available for use. Further, in the alternative when unskilled senders and/or recipients rely on currently available outside technical sources for faxing, short-wave radio communication, or e-mail services, the privacy of the communication may be compromised. While an increasing number of people are becoming computer literate and starting to rely on computers for a significant part of their communication needs, there are still those without adequate computer skills who cannot take advantage of this type of communication, and those for whom family separation has imposed at least a temporary financial burden which makes the purchase or lease of computer equipment for both correspondents unfeasible. At this time there is no known communication system or method that is low in cost to the user, private, immediate, and allows the transfer of up-to-date still and moving images between correspondents.

In addition, money transfer between remotely located family members and friends is often needed and poses its own set of challenges. Money exchange through the mail is slow and frequently places the money at risk for loss. Inter-bank transactions can enhance transfer security, however they can be expensive and delays in money distribution are known to occur. Money can also be wired to individuals, however, delays can be encountered when codes are forgotten and misdirection of finds has been known to happen, many times through fraud. Where family members or friends are remotely situated from one another and have the need to periodically communicate, it would be useful to have a technologically sophisticated means for combining a videoconferencing type of communication with the prompt transfer of money, and to have such communication and money transfer available without requiring any of the senders or recipients to have computer expertise or purchase expensive equipment. The present invention provides such telecommunication and no other system and method are known that functions in the same manner or provides all of its advantages.

SUMMARY OF INVENTION—OBJECTS AND ADVANTAGES

It is the primary object of this invention to provide a computer-aided system and method which can be used by separated family members and others, whether computer literate or not, to visually communicate with one another, transfer money from one to the other, and transfer up-to-date still and moving pictures between them without having to purchase expensive computer and/or other electronic equipment to do so. It is also an object of this invention to provide a computer-aided communication system and method that will let a person who is not necessarily computer literate to send and receive confidential e-mail messages. A further object of this invention is to provide a computer-aided communication system and method which can provide telecommunication, money transfer, and transfer of up-to-date still and moving images at a cost to the user that is lower than that of prior art telecommunication systems. It is also an object of this invention to provide a computer-aided communication system and method that protects the privacy of all communications between users. It is a further object of this invention to provide a computer-aided communication system and method that is capable of automatically giving users a printed copy of all e-mail messages that are transmitted to them and allows them to confidentially send pre-written e-mail messages. It is also an object of this invention to provide a computer-aided communication system and method that allows a user to exchange information with all system subscribers if desired, such as information about items for sale, upcoming events, and available jobs, and for subscribers to screen such information in private.

As described herein, the present invention would provide a computer-aided system and method for telecommunication that would allow separated people who may not have sophisticated computer skills or state-of-the-art computer equipment of their own to schedule real-time long distance visual communication with one another, to conduct such communication in private, to effect prompt and secure transfer of money from one user to another, and to transfer up-to-date still and moving images between users. An Internet web site would be provided for the communication link so that local telephone numbers can be used and long distance charges avoided, and so that other information can be exchanged between subscribers such as e-mail and information about items for sale, upcoming events, and available jobs. It is contemplated for the system to comprise at least two control stations, a privacy booth in the vicinity of each control station, an e-mail station in the vicinity of each control station, and optional remote e-mail stations each placed in a monitored location, such as a restaurant, bar, or hotel lobby, to prevent theft or vandalism. Once the people desiring such communication have subscribed to the service and paid the designated subscription fee, each would be given a unique access code and assigned a unique e-mail address that would be added to a computer database of subscribers. Subscribers remote from one another would be able to schedule videoconferences in advance, at regular intervals where appropriate.

Immediately prior to the scheduled visual conferencing time, each subscriber or group of subscribers would be given an enclosed room by a local technician in which to conduct the visual communication in private, equipped at a minimum with a high resolution monitor, a live video capture camera, audio speakers, at least one microphone, a writing surface, and at least one piece of furniture to comfortably seat them. Set up of the computer equipment for the visual communication would be accomplished by a skilled computer technician located at each subscriber's site through the use of a central processing unit at a control station, which would most likely be used for simultaneous operation of multiple visual communication functions. In the preferred embodiment an independent e-mail station in proximity of the privacy booths but not connected directly to it, would allow subscribers to independently access written e-mail messages or still images sent to them by another subscriber, and receive a printed copy of each such message. No technician would be required. All the subscribers would have to do is type their unique assigned access code on a keypad, also type the name of the intended recipient subscriber on the keypad, and then insert the written message or picture into the scanner provided. A local or networked central processing unit would access the subscriber database, determine from the database the appropriate e-mail address of the intended recipient subscriber or subscribers, direct the scanner to scan the written message, and send the scanned image to named recipient subscribers' e-mail addresses without creating a file for the image elsewhere in the computer's memory, after which it would direct the scanner to return written message or picture to the sending subscriber. The transmittal would be prompt and the privacy of the communication would not be compromised. Should a subscriber want help in sending a private pre-written e-mail message to another subscriber, it could be given to a technician at the local control station with the names of the intended recipients and the transmitting subscriber's unique access code. The message or picture would then be scanned unread by the technician, automatically transmitted by the computer to the e-mail addresses of the intended recipient subscriber or group of recipient subscribers without creating a computer file for the transmitted message other than at the e-mail address of the intended recipient subscribers, after which the technician would return the written message unread to the transmitting subscriber. After the recipient subscriber accesses each e-mail message, in the preferred embodiment the computer would automatically delete the message from the recipient subscriber's e-mail address unless directed not to do so by the recipient subscriber. The subscription fee could include a predetermined number of e-mail transmittals during a pre-set period of time without additional charge, which would be monitored by the computer through the subscriber database, or in the alternative subscribers could be allowed the option of paying a set fee for each e-mail transmission. E-mail messages would be accessible by the recipient without paying a fee, any such expenses being covered by the fee paid by the transmitting subscriber. In the alternative, e-mail messages could be sent and received through remote e-mail stations each having a scanner, a printer, a display screen, and a keypad for data entry. Upon entry of an access code and/or the payment of a fee, a written message could be scanned, automatically sent to the e-mail address of the recipient, and promptly returned to the sender without having a computer file made for the message in any other location than the e-mail address of the intended recipient subscriber or subscribers. Sending subscribers would only need to remember and type their own access code, in addition to the name of the user. They would not be required to know the e-mail address of the recipient subscribers. To receive messages, receiving subscribers would only have to type their own unique access code on a keyboard or keypad, after which the computer would automatically direct all messages at the recipient subscriber's e-mail address to be automatically printed for the recipient subscriber. If the e-mail address contained no messages, it is contemplated that the recipient subscriber would be given a written message so indicating the lack of messages so there would be no question in the mind of the recipient subscriber as to whether messages had been received. Also, after printing, it is contemplated for the computer to automatically delete the message unless instructed by the recipient subscriber to retain it for a short period of time. It is contemplated at a minimum for e-mail stations placed in locations remote from a control station to have scanners, keyboards, and printers for the private transfer of previously composed messages, letters, and/or pictures. E-mail stations could also comprise an automated teller machine (ATM) so that people wanting to send money during a visual communication or to pay for the transmittal of e-mail messages would have the funds available to do so. It is contemplated that remotely located e-mail stations would be placed in supervised locations, such as in other business establishments to include but not limited to restaurants, hotels, bars, and grocery stores.

To exchange money during a web site visual communication of the present invention, the two corresponding subscribers would decide on an amount to be transferred. Then within view of the camera the donating subscriber would hand the designated amount of money to a technician present at his or her user location. At the recipient subscriber's location, the recipient's local technician would count the money and hand it to the recipient subscriber on camera, after which the recipient subscriber would sign documentation confirming his or her identity as well as receipt of the designated amount. Depending upon the amount of money to be transferred, a technician at the recipient's location would then on camera give the recipient the designated amount of money if it is small, or in the alternative a check or other type of easily cashed voucher would be handed to the recipient on camera. Monetary exchange would be prompt and the donating subscriber would have real-time confirmation that the money transfer had been made. In the alternative, particularly if the recipient subscriber was to be transferred a large amount of cash and did not have a bank account to use in cashing the check, the recipient would have the option to choose one of several pre-selected banks through which prior arrangements had been made and that had agreed to release funds to such recipients within a short period of time after receipt of a communication from the local technician that included the recipient subscriber's picture and an identification of the amount to be transferred to the recipient subscriber. A further money transfer alternative could involve the e-mail stations. One procedure would involve the donor arranging money transfer by filling out a standardized money transfer form and paying a local technician the amount to be transferred, after which a copy of the form would be e-mailed to the intended recipient subscriber. A security code known only to the recipient subscriber but not included on the e-mailed copy of the form could be added to the original form by the technician for later verification. When the recipient subscriber receives the e-mailed form, he or she would take it to a local control station. After the recipient subscriber's local technician verifies the security code through the donating subscriber's local technician. The funds would be released to the recipient subscriber as cash, a negotiable instrument, or as a result of the recipient subscriber's local technician sending a visual image of the recipient to a cooperating bank. Should either of the visual correspondents desire a up-to-date still or moving picture of the others with whom he or she is communicating, the technician at the location of the subscriber wanting the image can activate video-recording equipment at any designated time during the visual communication and thereafter provide the image or images to the user before he or she departs the premises. A window in the privacy booth, or a signal light on the outside of the booth in view of a technician at the control station, could be used to signal the technician of the appropriate time to begin image capture. The image preservation, as well as all communication, would be accomplished through computer software programming and to insure privacy for the users, and no record of the communication except the copy given to the user as he or she concludes the video communication session would be preserved thereafter. Since it is contemplated for the visual conferencing services to be scheduled in advance, a record of people using such services would necessarily be kept prior thereto, however, it would only be kept for a limited period of time following each conference, possibly until the subscriber pays for the next subscription fee. Walk-in service for visual conferencing would be possible, but not frequently requested since prior arrangements between remote subscribers would be necessary to insure that both were simultaneously present at a local control station for conduct of the conference. In the alternative, e-mail could be accessed at any time without a prior reservation and the e-mail or control stations would maintain no paper record of the content of any e-mail transaction. The number of e-mail transmissions made by subscribers within a designated subscription period might be temporarily maintained in the subscriber database when needed for billing purposes, however even that information would be unnecessary if each e-mail transmission was paid for by the sending subscriber at the time it was sent.

The description herein provides preferred embodiments of the present invention but should not be construed as limiting the scope of its telecommunication system and method. For example, variations in the size of the privacy booth and the selection of electronic equipment available therein; the type of printers used for the e-mail stations; the size, configuration, and positioning of high resolution monitor, live video capture camera, speakers, microphones, and writing surface used in each privacy booth; the type of access code used by the corresponding subscribers to send and receive e-mail messages; the order in which the visual communication, e-mail, money exchange, and information exchange takes place; and the type of fax, scanning, and copying equipment selected for use, other than those shown and described herein, may be incorporated into the present invention. Thus the scope of the present invention should be determined by the appended claims and their legal equivalents, rather than the examples given.

BRIEF DESCRIPTION OF THE DRAWINGS

FIG. 2 is an enlarged perspective view of the inside of one embodiment of a privacy booth.

FIG. 3 is an enlarged perspective view of a first embodiment of an e-mail station, optionally having an automated teller machine available for use.

FIG. 4 is a perspective view of a second embodiment of an e-mail station through which pre-recorded written messages can be sent, the second embodiment being configured as a wall-mounted unit for a location remote from the control station.

FIG. 5 is a perspective view of a third embodiment of an e-mail station through which pre-recorded written messages can be sent, the third embodiment being configured as an independent, free-standing unit for a location remote from the control station.

FIG. 6 is a flow chart of the steps involved in one preferred embodiment of the method of the present invention.

DETAILED DESCRIPTION OF PREFERRED EMBODIMENTS

Figure 1:
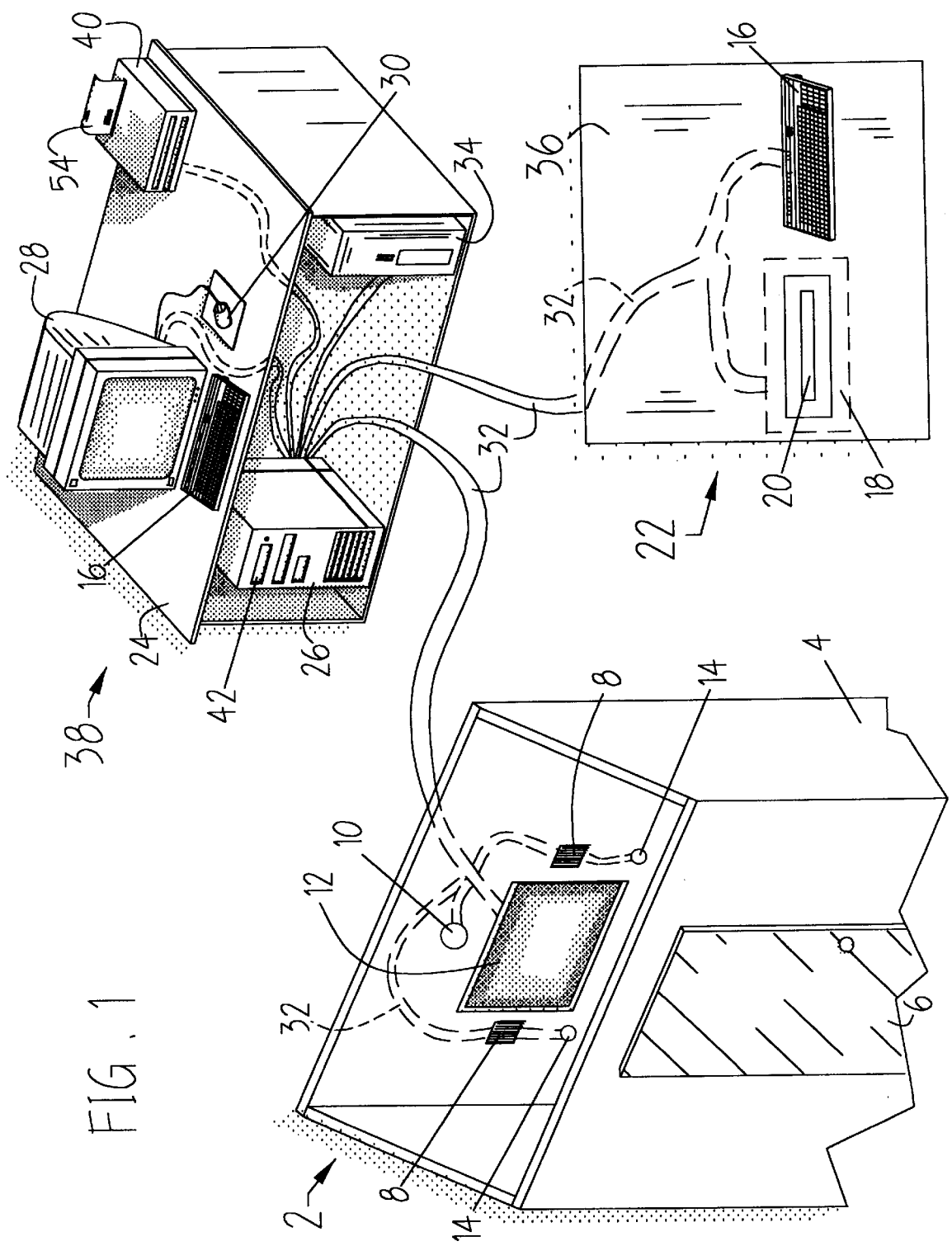
FIG. 1 is a not-to-scale perspective view of one embodiment of a privacy booth and e-mail station each connected to a central processing unit at a control station.

The present invention provides a computer-aided system and method for telecommunication that would allow people who may be unskilled in computer operation, and those not having available to them the necessary personal computer equipment for real-time visual communication with remotely located family members and friends, to conduct such communication in private and at a cost that is relatively low when compared to communication alternatives, in addition to providing an option for correspondents to promptly and securely transfer money from one to the other during such communication with instant transfer confirmation, and providing an option for capturing still and moving images of any visual communication participant for later use by one of their remote correspondents. An Internet web site (not shown) would be provided for the communication link so that local telephone numbers can be used and long distance charges avoided, and so that other information (not shown) can be exchanged between subscribers such as the e-mail transfer of written messages and images, as well as classified ads, notices about items for sale, notices about upcoming events, descriptions of employment opportunities, and other similar types of information that can be directed toward targeted groups of recipient subscribers. In the preferred embodiment it is contemplated for visual and e-mail communication to be available on a subscription basis to family, friends, and other people remotely located from one another who would benefit from periodic visual communication so that once each subscriber is assigned an e-mail address and an access code, the correspondents' names, addresses, and codes are stored in a subscriber database for use by central processing unit 26 in identifying recipients of e-mail communications. Also, to avoid conflicts in use of privacy booths 2 by subscribers, it is contemplated for visual communications to be scheduled in advance. At the appointed time, each visual correspondent would be given an enclosed private room in which to conduct the visual communication, such privacy booth 2 shown in FIG. 1. At a minimum, it is contemplated for privacy booth 2 to be equipped with a high resolution monitor 12, a live video capture camera 10, audio speakers 8, at least one microphone 14, a writing surface 58, and at least one piece of furniture 44 that can comfortably seat one or more adults. A light, number 50 in FIG. 2, and or buzzer (not shown), along with a small window, number 46 in FIG. 2, could be installed through one of the walls of privacy booth 2 for signaling a skilled computer technician (not shown) of the need for his or her assistance, such as for the initialization of the capture of still or moving images of a remote correspondent for one or more local correspondents. Set up and activation of the visual communication equipment would be accomplished by a technician skilled in computer and electronic equipment operation through use of a central processing unit 26 at a control station 38. The amount of equipment control options within a privacy booth 2 or at an e-mail station 22, available to subscribers for adjusting the operation of the visual communication and e-mail communication equipment, would be limited to avoid subscriber mistake and resulting equipment malfunction. It is contemplated for the system of the present invention to comprise at least two control stations 38, at least one privacy booth 2 and at least one e-mail station 22 in the vicinity of each control station 38, as well as optional remote e-mail stations 62 and 82 each placed in monitored locations, such as hotels, restaurants, or grocery stores to deter theft and vandalism. For e-mail communication, subscribers would not have to know the recipient subscriber's e-mail address, only the name of the intended recipient subscriber or identification of the group of subscribers to which the e-mail communication is directed.

FIG. 1 shows a simplified representation of one embodiment of the minimum equipment needed for proper function of each control station 38 for the conduct of visual conferences between remote subscribers in a subscriber database (not shown) as well as the transfer of e-mail messages between the same subscribers. In FIG. 1 a privacy booth 2 and an e-mail station 22 are shown electronically connected to a control station 38 by data transfer cables 32. Where appropriate and feasible, wireless connection is also contemplated. Each privacy booth 2 which can be used to conduct both audio and visual communication between subscribers (not shown) in remote locations would have a door 6 that can be closed, soundproofing wall and ceiling materials (not shown) where needed to prevent people in adjoining privacy booths 2 from hearing conversations through the walls 4 of adjacent privacy booths 2, and a ceiling although a ceiling is not shown in FIG. 1 for illustrative purposes so that the interior of privacy booth 2 can be seen. FIG. 1 also shows the interior of privacy booth 2 having a high resolution monitor 12, a live video capture camera 10, two audio speakers 8, and a microphone 14 and connection thereof to central processing unit 26 by data transfer cables 32. It is contemplated that volume of speakers 8 and microphone 14, as well as the contrast and brightness of high resolution monitor 12, be controlled by a skilled technician (not shown) to avoid user mistake and reduce equipment malfunction.

It is also contemplated for the number of controls and subscriber options available at e-mail station 22 to also be minimal to avoid subscriber induced malfunction. FIG. 1 shows a preferred embodiment of e-mail station 22 having a keyboard 16 and a printer 18 hidden from subscriber view behind wall 36. Keyboard 16 and printer 18 are each connected to central processing unit 26 at control station 38 through data transfer cables 32. It is contemplated for subscribers' sole access to printer 18 to be through opening 20. Printer 18 maintenance, including the periodic addition of paper and replacement of imaging powder or ink cartridges, would be handled by one of the skilled technicians (not shown) working at control station 38. It is contemplated for the selection of electronic equipment at control station 38 to vary, but at a minimum to include a central processing unit 26, keyboard 16, and video recording equipment such as VCR 34. FIG. 1 shows control station 38 having a desk unit 24, with a keyboard 16, monitor 28, mouse 30, and printer/scanner/fax 40 positioned on top of desk unit 24. Positioned below monitor 28 FIG. 1 shows control station 38 having a central processing unit 26 with a drive unit 42 for removable information storage diskettes (not shown), VCR 34, and data transfer cables 32 connected between central processing unit 26 and monitor 28, printer/scanner/fax 40, privacy booth 2, and e-mail control station 22. Although not shown and optional according to user preference, it is contemplated for control station 38 to comprise individual printer, scanner, and fax devices instead of or in addition to printer/scanner/fax 40.

FIG. 2 shows a preferred embodiment of privacy booth 2 equipped with one high resolution monitor 12, one live video capture camera 10, two audio speakers 8, one microphone 14, one writing surface 58, and three pieces of furniture 44 that can comfortably seat subscribers (not shown). The number, size, and positioning of high resolution monitors 12, cameras 10, audio speakers 8, microphones 14, writing surfaces 58, and pieces of furniture 44 relative to wall 4 are not critical. A light 50 and or buzzer 48, in addition to a small window 46 which optionally can have a sliding glass pane that can be opened by subscribers, could be used for signaling the skilled technician (not shown) of the need for his or her assistance, such as for the initialization of video capture of still or moving images of the remote correspondent for use by one of the local correspondents, or for the transfer of money. Writing surface 58 could be used for a recipient subscriber to sign a money receipt (not shown), or to temporarily positions papers or pictures that one subscriber wants to share with his or her visual correspondents. Immediately prior to a visual communication, equipment would be activated by a technician skilled in computer and electronic equipment operation through use of a central processing unit 26 at a control station 38. The amount of control options available to subscribers within a privacy booth 2, or at an e-mail station 22, would be limited to avoid subscriber mistake and equipment malfunction.

FIG. 3 shows a preferred embodiment of an e-mail station 22 having keyboard 16, a piece of furniture 44 in the form of a chair positioned in front of keyboard 16, a printer 18 hidden from view of a user (not shown) but accessible through an opening 20 in wall 36 with paper 54 containing an e-mail message or a statement identifying the lack of e-mail messages extending through opening 20. FIG. 3 also shows printer 18 sitting upon a supporting surface 56 behind wall 36. It is not critical whether supporting surface 56 is attached to wall 36 or separate from wall 36, and long as supporting surface 56 is sufficiently large and sturdy to permit printer 18 to properly and safely function without undue risk of falling therefrom. It is also not critical whether supporting surface 56 is smaller than, the same size as, or larger than the footprint of printer 18, however, it is not contemplated for supporting surface 56 to have an unduly large perimeter dimension. In the preferred embodiment e-mail station 22 would allow subscribers to access messages sent to their assigned e-mail address and give them automatic printed copies of the messages received once they have typed their e-mail address, their unique access code, or both, on keyboard 16. If no messages had been received in the interim since the last time the subscriber checked his or her e-mail address, it is contemplated that the central processing unit 26 shown in FIG. 1 would direct printer 18 to print a statement on paper 54 identifying the lack of messages for the subscriber. FIG. 3 also shows e-mail station 22 having an optional automated teller machine 60 so that people wanting to pay for the cost of sending e-mail messages, to have money to send to a visual correspondent, or to have money to pay for off-site purchases would have the necessary finds available to do so. To exchange money through the web site during a visual communication using the preferred embodiment of the present invention, the two visual correspondents (not shown) would decide on an amount to be transferred. Then the donating correspondent while in front of the camera 10 in his or her privacy booth 2 would hand the designated amount of money to a local technician present in the donor's privacy booth 2 who is also positioned in front of camera 10 so as to be visible to both the remote correspondent and a remote technician in the recipient correspondent's privacy booth 2. At the recipient subscriber's location and in front of his or her camera 10, the recipient would sign documentation (not shown) confirming his or her identity as well as receipt of the identified money transfer amount. A technician at the recipient's location would then on camera 10 give the recipient the identified amount of money. The monetary exchange would be immediate and the donor would have real-time confirmation that the money transfer had been made. In the alternative or if the identified money transfer amount is large, so as not to make the recipient's control station 38 a target of theft or vandalism, the technician at the recipient's location could either give the recipient a check or bank voucher. Should a bank voucher be used, the recipient's technician would have made prior arrangements with a bank in the vicinity of control station 38 to allow money transfer to recipient subscribers. Then immediately after money transfer, the recipient's local technician would capture the recipient's image on camera 10 and through central processing unit 26 send the recipient subscriber's image to the bank so that only a person looking like the recipient and producing a bank voucher with a serial number and in the amount identified in the communication received by the bank's computer or fax machine would be able to retrieve the transferred money amount. With the bank having a clear and detailed picture of the recipient, it is contemplated that the opportunity for someone to obtain the transferred money by fraud would be greatly reduced. Should either of the correspondents during a visual communication desire an up-to-date still or moving picture of remote correspondent, the technician at the location of the correspondent desiring the image can be requested to activate a video-recording device at any designated time during the visual communication and after the conclusion of the visual communication provide the finished still and/or moving image or images to the correspondent before he or she departs the premises. The image preservation, as well as all communication, would be accomplished through computer software programming and to insure privacy for the correspondents, no record of the communication other than the copy given to the correspondent as he or she concludes the video communication session would be preserved thereafter.

FIG. 4 shows a preferred embodiment of a wall-mounted e-mail station 62 having two keypads 68 each positioned adjacent to a different display screen 98, a printer opening 20 through which a user could receive e-mail messages on paper 54, and a separate scanner opening 66 through which a user could introduce written message or images on paper 54 for scanning and transfer to another subscriber e-mail address in the subscriber database (not shown). Depending upon the scanner 86 used, two scanner openings 66 might be required. E-mail station 62 could be used as a substitute for the e-mail station 22 shown in FIG. 3, simultaneously with e-mail station 22 so that more than one subscriber at a time can access individual e-mail messages, or as a remote e-mail station placed in a business location such as a hotel, restaurant, or grocery store (not shown). It is contemplated for the paired keypad 68 and display 98 in FIG. 4 to be used by the sending subscriber to type his or her assigned access code and the name of the intended subscriber recipient. Should the transferred message be a classified ad or sale notice intended for all subscribers in the subscriber database or a pre-selected group of subscribers in the subscriber database, the sending subscriber upon prompting by display 98 would simply type the word "all", "family", "sisters", "all women", "all men", or some other pre-arranged group term and the computer would be programmed to automatically send the message to all such recipient subscribers. Since it is contemplated for e-mail station 62 shown in FIG. 4 to optionally be placed in remote locations unsupervised by skilled technicians except for the regular visits by maintenance personnel, the embodiment of e-mail station 62 shown in FIG. 4 also has an on-site payment unit, shown in FIG. 5 as number 88, configured for accepting coins 76 and credit/debit cards 72 when the subscriber is required to pay immediately prior to transmission for each message that he or she desires to send to others in the subscriber database. FIG. 4 shows on-site payment unit 88 having a keypad 68 for typing information such as a bank-assigned access code and the number of messages to be sent, a display 98 for communicating with the sending subscriber, a coin vault 74, a credit/debit card slot 70, hinges 78 for allowing the front cover of on-site payment unit 88 to be opened for retrieval of coins 76, and a lock 80 to prevent unauthorized retrieval of coins 76. The positioning of scanner opening 66, printer opening 20, on-site payment unit 88, keypad 68, and display 98 are not critical to wall-mounted e-mail station 62 and it is contemplated for wall-mounted e-mail station 62 to have varying arrangements of subscriber communication devices as well as differing embodiments such as one in which a combined scanner/printer device such as scanner/printer/fax 40 is used to both send e-mail messages and receive them through a single aperture similar to either scanner opening 66 or printer opening 20. Another possible embodiment variation of wall-mounted e-mail station 62 would include a slot for receiving currency in addition to or in place of coins, and/or an opening through which a payment receipt can be given to the sending subscriber, such as receipt dispensing slot 96 in FIG. 5. Although not shown in FIG. 4, but similar to that shown in FIG. 5, it would be critical for wall-mounted e-mail station 62 to have an electrical connection to a remote power source, a telephone access connection, and a central processing unit with a modem for accessing the Internet web site and information in the subscriber database.

FIG. 5 shows a preferred embodiment of a stand-alone e-mail station 82 having two keypads 68 each positioned adjacent to a different display screen 98, a printer opening 20 through which a user could receive e-mail messages, and a separate scanner opening 66 through which a user could introduce written message or images for scanning and transfer to another subscriber e-mail address in the subscriber database. Keypads 68, displays 98, printer opening 20, and scanner opening 66 are all shown in FIG. 5 to be connected through the same wall of a cabinet 84. In the alternative if the surroundings of stand-alone e-mail station 82 permit, printer opening 20 could be positioned through a different wall of cabinet 84 so that a subsequent subscriber could access one of the keypads 68 while the previous subscriber's e-mail messages are being printed. FIG. 5 shows a scanner 86 and a printer 18 positioned respectively behind scanner opening 66 and printer opening 20, although in actual use they each would be hidden from the view of a sending subscriber standing in front of e-mail station 82. Although not critical, for ease of use it is contemplated for scanner opening 66 and printer opening 20 to be positioned beneath keypads 68 and associated displays 98. FIG. 5 also shows a central processing unit 26 positioned behind the front wall of cabinet 84 and adjacent to on site payment unit 88, as well as data transfer cable connections 32 between central processing unit 26 and on-site payment unit 88, scanner 86, and printer 18, in addition to a telephone line 92 and an electric cord 90 being connected to central processing unit 26 and extending through cabinet 84. Although not shown in FIG. 5 it is contemplated for central processing unit 26 to have a modem for accessing the Internet web site and information in the subscriber database (not shown). It is contemplated for stand-alone e-mail station 82 to be employed primarily for use in an off-site location remote from control station 38, however, stand-alone e-mail station 82 could also be used as a substitute for the e-mail station 22 shown in FIG. 3, or wall-mounted e-mail station 62 shown in FIG. 4, or simultaneously with either one so that more than one subscriber at a time can access individual e-mail messages. It is contemplated for the paired keypad 68 and display 98 in FIG. 5 to be used by the sending subscriber to type his or her assigned access code and the name of the intended subscriber recipient. Should the transferred message be a classified ad or sale notice intended for all subscribers in the subscriber database or a pre-selected group of subscribers in the subscriber database, the sending subscriber upon prompting by display 98 would type the name of the recipient subscriber or a pre-arranged group term identifying the pre-selected and the computer would be programmed to automatically and promptly send the message to all of the identified recipient subscribers. Since it is contemplated for stand-alone e-mail station 82 shown in FIG. 5 to optionally be placed in remote locations unsupervised by skilled technicians, the embodiment of stand-alone e-mail station 82 shown in FIG. 5 also has an on-site payment unit 88 configured for accepting coins 76 and credit/debit cards 72 when the subscriber is required to pay immediately prior to transmission for each message that he or she desires to send to others in the subscriber database. FIG. 5 shows on-site payment unit 88 having a keypad 68 for typing information such as a bank-assigned access code and the number of messages to be sent, a display 98 for communicating with the sending subscriber, a coin vault 74, a credit/debit card slot 70, a subscriber receipt dispensing slot 96, hinges 78 for allowing the front cover of on-site payment unit 88 to be opened for retrieval of coins 76, and a lock 80 to prevent unauthorized retrieval of coins 76. FIG. 5 further shows a rear door 94 in cabinet 84 for emergency access to and routine maintenance of on-site payment unit 88, central processing unit 26, scanner 86, and printer 18. Although not shown and not critical to standalone e-mail station 82, it is considered within the scope of the present invention for cabinet 84 to have support feet, rollers, or wheels connected to its bottom surface for ease in moving cabinet 84 when necessary for maintenance technicians to gain access to rear door 94. The positioning of scanner opening 66, printer opening 20, on-site payment unit 88, keypad 68, and display 98 are not critical to stand-alone e-mail station 82 and it is contemplated for stand-alone e-mail station 82 to have varying arrangements of subscriber communication devices as well as differing embodiments such as one in which a combined scanner/printer device such as scanner/printer/fax 40 is used to both send e-mail messages and receive them through a single aperture similar to scanner opening 66 or printer opening 20. Combining the scanner and printer functions into one device would reduce the cost of stand-alone e-mail station 82, however, it would also reduce its functionality in instances of malfunction. Having independent scanners 86 and printers 18 would allow each to continue to function when the other becomes inoperative, so that a sending subscriber could still transmit an e-mail message through scanner 86 even if printer 18 was not working, or vice versa. Another possible embodiment variation of stand-alone e-mail station 82 would include a slot for receiving currency in addition to or in place of coins. It is contemplated for stand-alone e-mail station 82 to be placed in supervised locations, such as in a hotel lobby, a grocery store, or a restaurant at a busy freeway exit with a high volume of business from travelers, or one located near an area attracting a high volume of foreign tourists or other visitors.

FIG. 6 shows the necessary and optional steps in one preferred embodiment of the present invention for the conduct of e-mail transmission and retrieval between database subscribers, as well as visual conferencing between subscribers that includes capture of remote correspondent images and the secure transfer of money between visual correspondents. To use the present invention, two technicians each skilled in computer and electronic equipment operation, and each in a location remote from the other, would set up a central processing unit 26 and connect it to a printer/scanner/fax unit 40, a live video capture camera such as camera 10, microphones 14, video recording equipment such as VCR 34, speakers 8, a high resolution monitor 12, an e-mail station 22, 62, or 82 having optional coin/credit card/debit card activation, an optional automated teller machine 60, an optional scanner 86, a printer 18, keypad 68 for data input, and a display screen 98, the system also having Internet access to a web site programmed to provide subscriber e-mail communication. After the technicians set up and make the visual and e-mail communication systems operational, they would use the central processing unit 26 and the web site to create a database of subscribers who want to send written e-mail messages and pictorial images to other database subscribers, as well as conduct visual conferences with other subscribers, in addition to creating an e-mail address for each such subscriber, and assigning each such subscriber a unique system access code. Once a subscriber decides that he or she would like to communicate with another subscriber, the subscriber would decide if a visual conference, an e-mail transmission, e-mail receipt, or a combination thereof is desired. If only e-mail transmission and receipt is desired and the subscriber does not want help from a technician at a control station 38, the sending subscriber could choose to approach a remote e-mail station, such as wall-mounted e-mail station 62 or stand-alone e-mail station 82. If only e-mail receipt is desired, e-mail station 22 could be used. On-site payment for each transmitted message could be paid at control station 38, e-mail station 62, or e-mail station 82. In the alternative, the recurring subscription fee paid by or on behalf of each subscriber could include a pre-selected number of e-mail transmissions per payment period that would not require the payment of an on-site fee. Once that number of e-mail transmissions is exceeded, central processing unit 26 would indicate to the sending subscriber that on-site payment is required until the start of the next subscription period. Should the sending subscriber need currency to send messages to other subscribers or later transfer money during a visual conference, the sending subscriber could access an automated teller machine with bank-assigned access codes if one were provided in the embodiment of the e-mail station he or she had approached. After obtaining the necessary payment, if needed, the sending subscriber would direct central processing unit 26 to send a message to another person in the subscriber database by prepaying cost of sending each message, either as part of his or her pre-paid subscription fee or on-site payment. Once transmission payment verification is concluded, the sending subscriber would place a written message into scanner 86, and using keypad 68 type the sending subscriber's unique access code as well as the name of the intended recipient subscriber, or a pre-selected term for a group of intended recipient subscribers, when prompted to do so by display 98. Central processing unit 26 would then access the subscriber database to verify the typed access code of the sending subscriber. If the typed access code were not valid, central processing unit 26 would rescind the payment transaction and direct a refund to be made. If the typed access code is valid, central processing unit 26 would access the subscriber database to identify the e-mail address of the named recipient subscriber or subscribers, then direct scanner 86 to scan the written message inserted through scanner opening 66, and send the scanned image to the identified e-mail addresses without creating a permanent file for the scanner image in the computer's memory, after which central processing unit 26 would direct scanner 86 to return the inserted written message to the sending subscriber. If the sending subscriber subsequently checked his or her received e-mail messages and found a message requiring an immediate response, the sending subscriber could also send additional messages in a like manner. However, if the sending subscriber would also like to conduct a visual conference with another person or group of people in the subscriber database, the sending subscriber would then have to approach a control station 38.

Preferably appointments for visual conferences would be set up in advance, or on a recurring basis, but it is also contemplated for visual conferences to be held on short notice where both subscribing correspondents come to control stations 38 remote from one another at a time period during which there is no conflicting subscriber use of privacy booth 2. Immediately prior to the appointed time, a technician at the location of each subscribing correspondent would activate and confirm the optimum operation of speakers 8, microphones 14, high resolution monitors 12, and cameras 10 in the privacy booth 2 intended for use, and then direct central processing unit 26 to access the visual conferencing web site through which conduct of the intended private communication between people in the subscriber database can be held. After everything is confirmed to be in good working order, each corresponding subscriber would enter a local privacy booth 2. If a still image or moving images of the remote correspondent is desired during the visual conference, or money transfer between correspondents contemplated, each correspondent should so notify his or her local technician prior to entering privacy booth 2. A subscriber desiring a printed image or images of his or her remotely located correspondent would send an audio or visual signal to the local technician to direct central processing unit 26 to direct the capture and printing of an image of the remote subscriber at designated times. The images would be presented to the local subscriber after conclusion of the visual conference. The only images made would be given to the correspondent and it is contemplated that no copy or computer file of the image would be 38. If in addition to receiving a copy of a captured image of the remote correspondent, the subscriber would like to send a copy of the captured image by e-mail to another person in the subscriber database, such as a sister, uncle, cousin, or friend, the subscriber would so notify the local technician of the names of the intended recipients and the local technician would also direct central processing unit 26 to send the captured image or images to each of the intended recipients without creating a file of the captured images in the computer's memory. Should a subscriber desire a videotape of his or her remotely located correspondent during the visual conference, the subscriber desiring the videotape could also send an audio or visual signal to the local technician for the local technician to direct central processing unit 26 to initiate image capture in videotape form of the remote correspondent for delivery to the local subscriber after conclusion of the visual conference, before the subscriber leaves control station 38.

Should money transfer be desired between correspondents, the sending subscriber would visually identify the amount of money the recipient is to receive in front of camera 10 in view of the local technician, the remote technician, and the recipient. Thereafter the sending subscriber while in front of camera 10 would place the identified amount of money into the hands of the local technician, so that the remote technician and the recipient can observe the transfer being made. Thereafter the recipient's local technician in front of the camera 10 in the recipient's privacy booth 2, so as to be visible by the sending subscriber and the sending subscriber's local technician, would place the identified sum via cash/check/bank voucher into the hands of the recipient, individually counting out the currency for the recipient if a cash transaction was made. Before leaving his or her local privacy booth 2 the recipient would sign a paper (not shown) acknowledging receipt of the transferred sum and hand the receipt to his or her local technician. It is contemplated for large sums to be transferred in the form of a check or bank voucher so that control station 38 is not made a target of theft, vandalism, or extortion. If the money transfer was made to the recipient by bank voucher, the recipient's local technician would direct central processing unit 26 to capture and send an image of the recipient by fax or computer to a local bank for confirmation of the identity of recipient when he or she arrives at the bank to claim the transferred sum, thus greatly reducing the possibility of the fraudulent claiming of such sum by anyone other than recipient.

As FIG. 6 further describes, central processing unit 26 would maintain visual communication between corresponding subscribers after money transfer, until subscribers each exit their privacy booths 2 and notify their local technicians that the visual conference is concluded so that the local technicians can each then direct the local central processing units 26 to terminate their web site connections. Subscribers could then schedule additional visual conferences, check e-mail messages sent to their assigned e-mail addresses through a nearby e-mail station 22, or send written e-mail messages to other people in the subscriber database through the local technician at control station 38 or through a nearby e-mail station 62 or 82. When all of the communication activity of the subscriber is concluded, the subscriber would then leave control station 38. When all subscribers have left control station 38, if the central processing unit 26 at control station 38 is networked with central processing units 26 at remote e-mail stations 62 or 82, the local technician would direct the central processing unit 26 at control station 38 to enter an inactive mode from which it can be rapidly returned to active status by subscribers at remote e-mail stations 62 or 82 upon demand who enter their assigned access codes on keypad 68 and cause the central processing unit 26 at control station 38 to direct scanner 86 to scan one or more written messages, access the subscriber database to find the e-mail address of each identified recipient subscriber, and send the messages to the proper e-mail addresses, or by subscribers at remote e-mail stations 62 or 82 who direct central processing unit 26 to retrieve mail from their e-mail address after which printer 18 prints a copy of each e-mail message for the accessing subscriber, or in the alternative prints a statement for the subscriber that no new messages had been received.

Although not limited thereto, and it is considered within the scope of the present invention to have similar, comparable, and upgraded hardware and software in place of or in addition to some or all of the equipment identified below, for illustrative purposes the following electronic equipment would be minimally acceptable for building a preferred embodiment of the present invention to accomplish the communication objectives identified herein. It is contemplated that the central processing units 26 used in control stations 38 of the preferred embodiment have at least 128 MB 100 MHz Synchronous Dynamic Random Access Memory and at least 16 MB of non-removable storage, such as a Western Digital 16 MB hard disk drive, as well as an ABIT BX-6 mainboard with an Intel Pentium Im 500 MHz processor. In addition, it is contemplated for each central processing unit 26 in control stations 38 to have a Sound-Blaster or comparable audio card, and a video card with at least a peak fill rate of 250 million bilinear filtered, multi-textured pixels per second; up to 8.3 million triangles per second at peak rates; a 2.4 GB/sec total memory bandwidth; 100% hardware triangle setup engine; TwiN-Textel (TNT) dual 32-bit 3D rendering pipeline; a 2 texture mapped, lit pixels per clock cycle; and single pass multi-texturing support such as DirectX®8.X and OpenGL® ICD. Further, the communications sub-system in each central processing unit 26 of control stations 38 in the present invention would preferably have a 10/100 Base T autodetect PCI or comparable network interface card; Class 1 and 2.0 Group m 14.4 Kbps send and receive fax capability compatible with ITU and Bell standards from 56 Kbps down to 1200 bps, V.42/ MPN 2–4 error control, V.42 bis/MPN 5 data compression, ITU V.90 56 Kbps, $x2^{TM}$ technology 56 Kbps download, and ITU V.34 33.6 Kbps; as well as a T1/Fractional T1 router with integrated DSU/CSU; standard and extended access control lists (ACLs); Lock and Key (dynamic ACLs) context-based access control (CBAC); IPSec tunneling with data encryption standard (DES); Layer 2 Forwarding (L2F) and Layer 2 Tunneling Protocol (L2TP); attack detection and prevention; and router/route authentication, authorization, and accounting such as PAP/CHAP, TACACS+, and RADIUS. Encryption software would also be preferred to protect the privacy of subscriber access codes and other information in the subscriber database.

Also, and although not limited thereto and provided herein only as an illustrative example, in the present invention camera 10 would preferably be capable of 16.7 million color, live video capture up to 30 frames per second at resolutions of 352×288 and up to 15 frames per second at 640×480; a focusable lens with a range of 3 inches to infinity; 640×480 pixel true-color CMOS sensor; and a USB port or a USB hub interface. Speakers 8 in the present invention would preferably be Creative Labs Model C8W200 or equivalent with built-in amplifier and magnetically shielded satellites. Keyboard 16 in the present invention would preferably be an industrial membrane keyboard with a NEMA 4× Stainless Steel enclosure, an Integrated Pointing Device, a built-in static shield, and embossed key borders. High resolution monitor 12 in the present invention would preferably have a minimum viewable image size that is 19.8 inches measured diagonally, 90 deflection, a maximum resolution of 1600×1200 @ 85 Hz, an aperture grille pitch ranging between 0.25 and 0.27 mm, a horizontal scan range of 30–107 kHz, a vertical scan range of 46–160 Hz, and 100–240V AC 50/56 Hz power requirements. Further, the defining criteria for the scanner 86 and printer 18 used in each e-mail station 22, 62, or 82 would vary depending upon the number of subscribers anticipated to access the e-mail station 22, 62, and 82 within a desired maintenance period. The paper storage capacity, speed of printing or scanning, as well as image quality and mechanical reliability would be among the factors considered in the selection of a printer 18 or scanner 86 for each individual location where an e-mail station 22, 62, or 82 is set up for use.

What is claimed is:

1. A computer-aided telecommunication system that would allow subscribers who are part of a subscriber database, who may be unskilled in computer operation and those not having available to them the necessary personal computer equipment to conduct real-time visual communication with others, to conduct such visual communication in private with remote subscribers who are part of the same subscriber database and other people accompanying the remote subscribers, at a cost that is relatively low when compared to communication alternatives, in addition to providing an option for subscribers to promptly and securely transfer money from one to the other during a visual communication with instant on-camera money transfer confirmation, providing an option for subscribers to obtain still and moving images of themselves and any other person participating in a visual communication, and providing an option for subscribers to transfer written and pictorial information to others in the subscriber database, said system comprising:

an Internet web site configured for visual and e-mail communication between subscribers who are part of a subscriber database and located remotely from one another;

at least two privacy booths, each in a location accessible to subscribers desiring to participate in real-time visual communications with remote subscribers, each of said privacy booths comprising an enclosed room in which sound produced inside said room is not easily heard by anyone positioned immediately outside of said room; high resolution image display means within said enclosed room for showing subscribers and any accompanying visual correspondents participating in a visual communication with remote participants, including both subscribers and people accompanying the subscribers, a clear real-time image of the remote participants while they remain positioned within a distant one of said privacy booths; live image capture means within said enclosed room for digitizing images of subscribers and accompanying visual correspondents in said room and transmission through said Internet web site to the distant one of said privacy booths housing said remote participants; at least one microphone within said enclosed room for capturing sounds made by subscribers and accompanying visual correspondents and transmission through said Internet web site to the distant one of said privacy booths housing said remote participants; and at least two audio speakers within each of said enclosed rooms for projecting sounds made in the distant one of said privacy booths by said remote participants to subscribers and said accompanying visual correspondents in said room, and wherein controls for said high resolution image display means, said live image capture means, said microphone, and said audio speakers in said room remain substantially inaccessible to subscribers and said accompanying visual correspondents to prevent malfunction and preserve optimum performance of said high resolution image display means, said live video capture means, said microphone, and said audio speakers;

at least two control stations, at least one of said privacy booths being associated with each of said control stations, each of said control stations having a central processing unit with modem means for accessing said Internet web site; scanner means electronically connected to said central processing unit for capturing and digitizing images of written and pictorial information for e-mail transfer from one subscriber to any of the subscribers in the subscriber database without said central processing unit maintaining a permanent record thereof; a computer keyboard electronically connected to said central processing unit; printer means electronically connected to said central processing unit for creating high resolution copies of written and pictorial information transferred to recipient subscribers by e-mail and which become promptly available to recipient subscribers when they reveal a uniquely assigned access code to said central processing unit through said keyboard, and also for printing still images of visual communication participants; fax means also electronically connected to said central processing unit for transmission of high resolution images of money receiving subscribers participating in a visual communication who receive a money sum by way of a bank voucher, as well as transmission of corresponding voucher information, to a bank selected by the money receiving subscriber so that representatives at the selected bank are able to readily confirm the identify the money receiving subscriber and know how much to pay the money receiving subscriber when the money receiving subscriber presents the voucher to the bank to claim the transferred money sum amount, the selected bank being one of several banks conveniently accessible from the one of said privacy booths in which the visual communication was conducted during which the money receiving subscriber received the bank voucher and which through prior arrangement has agreed to transfer money sums in exchange for such bank vouchers; video recording means electronically connected to said central processing unit for transferring to videotape without said central processing unit maintaining a permanent record thereof a copy of moving images of subscribers, remote subscribers, and other accompanying people captured during a visual communication for immediate delivery at the conclusion thereof to each participant of the visual communication requesting in advance a preserved copy of said images; and at least one electronic technician having skills for activating said central processing units, said modem means, said scanner means, said printer means, said fax means, and said video recording means to implement private and secure transfer of visual communication, money, written messages, and printed pictorial information between remotely located subscribers; and data transfer means between each of said privacy booths and a nearby one of said control stations for achieving electronic connection between said privacy booths and said control stations as well as two-way electronic data communication therebetween.

2. The system of claim 1 wherein said privacy booths each further comprise at least one writing surface and at least one piece of furniture for comfortably seating subscribers and accompanying visual correspondents.

3. The system of claim 1 wherein said privacy booths each further comprise components selected from a group consisting of windows with permanently closed panes, windows with a least one sliding pane, audio signaling means for capturing the attention of a skilled electronic technician at said control station through use of sounds, and visual signaling means for capturing the attention of a skilled electronic technician at said control station through use of steady and intermittently operating lights.

4. The system of claim 1 further comprising at least one e-mail station for independent access by subscribers in the subscriber database to written and pictorial information transferred to them by e-mail through said Internet web site, said system also comprising data transfer means between said e-mail station and one of said control stations for achieving electronic connection between said e-mail station and said control station as well as two-way electronic data communication therebetween.

5. The system of claim 4 wherein each of said e-mail stations comprise components selected from a group consisting of computer keyboards, computer printers, display screens, and bank connected automated teller machines.

6. The system of claim 1 wherein said data transfer means between said control stations and each of said privacy booths as well as each of said e-mail stations is selected from a group consisting of data transfer cables and wireless connection devices.

7. The system of claim 1 further comprising at least one remote e-mail station for independent e-mail transfer of written and pictorial information through said Internet web site by subscribers in the subscriber database, as well as independent access by the subscribers through said Internet web site to e-mail transferred written and pictorial information sent to them, said system also comprising remote data transfer means through said Internet web site between said remote e-mail station and one of said control stations.

8. The system of claim 7 wherein each of said remote e-mail station comprise components selected from a group consisting of central processing units, computer keyboards, computer printers, scanners, fax machines, keypads, display screens, automated teller machines, coin accepting receptacles, currency accepting receptacles, debit card reading receptacles, credit card reading receptacles, locks for safeguarding currency and coins deposited into said coin accepting receptacles and said currency accepting receptacles, and maintenance access means for routine and emergency servicing of said central processing units, said computer printers, said scanners, and said fax machines.

9. A method of computer-aided communication between subscribers who are part of a subscriber database and located remotely from one another, and who may be unskilled in computer operation, which allows private transfer of written messages and pictorial information between such subscribers, private real-time visual communication between them and others accompanying them, secure transfer of money between subscribers during a private visual communication with immediate money transfer confirmation, and both still and moving image capture of subscribers and others accompanying them during a visual communication, said method comprising the steps of:

providing an Internet web site configured for visual and e-mail communication between remote people, two technicians skilled in computer and electronic equipment operation, two privacy booths each having a high resolution monitor, a live video capture camera, audio speakers, a microphone, two control stations each having a central processing with a network interface card, a soundcard, a videocard and a router, a fax device with data compression capability, a computer monitor, a keyboard, a printer, a scanner, and a video recorder, and also providing a plurality of two-way data transfer cables and telephone service access lines;

using said central processing unit to create a database of subscribers desiring to have real-time visual communication with one or more subscribers in the database who are positioned remotely therefrom and people accompanying the remote subscribers;

assigning a unique access code and a unique e-mail address to each of the subscribers in the database;

storing access code and e-mail address information in said subscriber database in encrypted form for cross-referencing access by said central processing unit but not by subscribers;

locating said privacy booths in positions remote from one another and readily accessible to database subscribers desiring visual communication with one another;

positioning one of said control stations in close proximity to each of said privacy booths;

using said two-way data transfer cables to connect said central processing unit in each of said control stations to one of said fax devices, computer monitors keyboards, printers, scanners, and video recorders, as well as to said high resolution monitor, said live video capture camera, said audio speakers, and said microphone in the nearby one of said privacy booths;

one of the subscribers approaching a conveniently located one of said control stations;

if only e-mail receipt is desired and after the skilled technician has connected said central processing unit to said Internet web site through one of said telephone service access lines, the subscriber revealing his or her assigned access code to said central processing unit using said control station keyboard and immediately thereafter obtaining copies of e-mail messages from said control station printer;

if e-mail transmission of a written message and pictorial information is desired, after providing payment therefore to a skilled technician at said control station the subscriber handing to the skilled technician the written message and pictorial information for which transmission is desired, the subscriber identifying the name of all subscribers intended for receipt of the e-mail transmission, the skilled technician connecting said central processing unit to said Internet web site through one of said telephone service access lines and typing the names of recipient subscribers on said control station keyboard, the skilled technician placing the unread written message and pictorial information into said control station scanner and activating said scanner, said central processing unit accessing the subscriber database to identify the e-mail addresses of identified recipient subscribers and sending the scanned images to the identified e-mail addresses without creating a permanent file therein for the scanned images, and then the skilled technician retrieving the unread written message and pictorial information from said scanner and returning it to the sending subscriber;

if a visual conference with a remotely located subscriber in the subscriber database is desired, each visual communication participant consisting of subscribers and any people accompanying the subscribers entering a nearby privacy booth, a skilled technician at each privacy booth establishing access to said Internet web site, in addition to activating and confirming optimum operation of said speakers, said microphones, said high resolution monitors, and said live video capture cameras, each of said visual communication participants optionally sending a signal to the nearby one of said skilled technicians to activate said central processing unit and cause said central processing unit to direct the capture and printing of images of visual communication participants at designated times for distribution to the requesting visual communication participants without file copies of the images being made, visual communication participants also optionally identifying to the nearby one of said skilled technicians names of receiving subscribers in the subscriber database to which it is desired that copies of the images be sent by e-mail and requesting said skilled technicians to send a copy of the images by e-mail without causing a copy of the images to be maintained by said central processing unit, each of said visual communication participants optionally sending a signal to the nearby one of said skilled technicians to activate said central processing unit and cause said central processing unit to direct the capture and printing of moving images of visual communication participants at designated times for distribution in the form of a videotape to the requesting visual communication participants without file copies of the moving images being made, each of said visual communication participants optionally transferring money to another visual communication participant by the donor participant visually identifying the amount of money to be transferred to the money receiving participant in front of camera in view of a skilled technician in each of said privacy booths and the money receiving participant, the donor participant while in front of camera and so that the remote technician and the money receiving participant can observe the transfer being made, placing the identified amount of money into the hands of the adjacent one of said skilled technicians, the one of said skilled technicians adjacent to the money receiving participant in front of the camera and so as to be visible by donor participant and the one of said skilled technicians adjacent to the donor participant, placing the identified amount of money into the hands of the money receiving participant, individually counting out the currency for the money receiving participant if a cash transaction is made, and the money receiving participant signing a receipt for the identified amount of money and handing the receipt to the adjacent one of said skilled technicians, and after said visual communication is concluded said participants each leaving the adjacent ones of said privacy booths, notifying the adjacent ones of said skilled technicians that the visual communication is concluded, each of the skilled technicians giving the still and moving images captured during the visual communication to the subscribers previously requesting them, and said skilled technicians each then directing the central processing units to terminate said Internet web site connections.

10. The method of claim 9 further providing the steps of providing a writing surface, and at least one piece of furniture upon which the visual communication participants can be seated, and the money receiving participant using said writing surface for signing the receipt.

11. The method of claim 9 wherein the step providing said privacy booths further comprises the step of providing privacy booths with components selected from a group consisting of windows with permanently closed panes, windows with a least one sliding pane, audio signals for capturing the attention of a skilled electronic technician at said control station, and visual signals for capturing the attention of a skilled electronic technician at said control station.

12. The method of claim 9 further comprising the step of providing e-mail stations for independent access without the help of a skilled technician by subscribers in the subscriber database to written and pictorial information transferred to them by e-mail through said Internet web site, and the step of using a portion of said two-way data transfer cables to establish electronic communication between said e-mail station and one of said control stations.

13. The method of claim 12 wherein the step of providing each of said e-mail stations further comprises the steps of providing e-mail station components selected from a group consisting of computer keyboards, computer printers, display screens, and bank connected automated teller machines.

14. The method of claim 13 further comprising the steps of providing e-mail stations having bank connected automated teller machines and subscribers optionally accessing said automated teller machine with bank-assigned access codes to obtain money to pay for e-mail transmissions and for transfer to money receiving participants during visual communications.

15. The method of claim 13 wherein the step of subscriber payment for e-mail transmissions is selected from a group consisting of pre-payment through payment of recurring subscription fees, on-site payment of the transmission amount to a skilled technician at a control station, and on-site placement of the transmission amount directly into remote e-mail stations.

16. The method of claim 9 further comprising the step of providing remote e-mail stations for independent transfer of written and pictorial information by subscribers to other subscribers in the subscriber database through said Internet web site without the help of a skilled technician, independent access without the help of a skilled technician by subscribers in the subscriber database to written and pictorial information transferred to them by e-mail through said Internet web site, the step of using a said telephone service access lines to establish data transfer communication between said remote e-mail stations and said control stations, and the step of skilled technicians directing said central processing unit at said control station to enter an inactive mode after visual communications are concluded from which it can be rapidly returned to active status by subscribers paying e-mail transmission fees at said remote e-mail stations.

17. The method of claim 16 wherein the step of providing each of said remote e-mail stations further comprises the steps of providing remote e-mail station components selected from a group consisting of central processing units, computer keyboards, computer printers, scanners, fax machines, keypads, display screens, automated teller machines, coin accepting receptacles, currency accepting receptacles, debit card reading receptacles, credit card reading receptacles, locks for safeguarding currency and coins deposited into said coin accepting receptacles and said currency accepting receptacles, and maintenance access means for routine and emergency servicing of said central processing units, said computer printers, said scanners, and said fax machines.

18. The method of claim 17 further comprising the steps of providing remote e-mail stations having bank connected automated teller machines and e-mail sending subscribers optionally accessing said automated teller machine with bank-assigned access codes to obtain money to pay for e-mail transmissions.

19. The method of claim 9 wherein the step of the skilled technician adjacent to the money receiving participant placing the identified amount of money into the hands of the money receiving participant further comprises the identified amount of money transferred being selected from a group consisting of cash, check, and bank voucher.

20. The method of claim 19 wherein the step of transferring the identified amount of money by bank voucher further comprises the steps of the one of the skilled technicians adjacent to the money receiving visual communication participant directing said central processing unit to capture and send an image of the money receiving participant by fax or computer to a bank for confirmation of the identity of the money receiving participant upon arrival at the bank to claim the transferred money sum.

* * * * *

UNITED STATES PATENT AND TRADEMARK OFFICE
CERTIFICATE OF CORRECTION

PATENT NO. : 6,292,211 B1
DATED : September 18, 2001
INVENTOR(S) : Martin R. Pena It is certified that error appears in the above-identified patent and that said Letters Patent is hereby corrected as shown below:

Column 3,
Line 23, after the words "misdirection of" delete "finds", and in its place insert "funds".

Column 16,
Line 45, after the word "Pentium" delete "I m", and in its place insert -- I I I --.
Line 59, after the word "Group" delete "m", and in its place insert -- I I I --.

Column 17,
Line 24, after the words "measured diagonally," the number "90" should not be in bold.

Signed and Sealed this

Eleventh Day of June, 2002

Attest:

JAMES E. ROGAN
Attesting Officer      Director of the United States Patent and Trademark Office